United States Patent
Goto et al.

(10) Patent No.: US 12,010,524 B2
(45) Date of Patent: Jun. 11, 2024

(54) BAND SHARING COMMUNICATION SYSTEM, LINE CONTROL METHOD, LINE CONTROL DEVICE, AND LINE CONTROL PROGRAM

(71) Applicant: NIPPON TELEGRAPH AND TELEPHONE CORPORATION, Tokyo (JP)

(72) Inventors: Daisuke Goto, Musashino (JP); Fumihiro Yamashita, Musashino (JP); Munehiro Matsui, Musashino (JP); Hiroki Shibayama, Musashino (JP); Yutaka Imaizumi, Musashino (JP); Koichi Harada, Musashino (JP); Izumi Urata, Musashino (JP); Masaki Shima, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 343 days.

(21) Appl. No.: 17/628,771

(22) PCT Filed: Jul. 24, 2019

(86) PCT No.: PCT/JP2019/029099
§ 371 (c)(1),
(2) Date: Jan. 20, 2022

(87) PCT Pub. No.: WO2021/014628
PCT Pub. Date: Jan. 28, 2021

(65) Prior Publication Data
US 2022/0279357 A1    Sep. 1, 2022

(51) Int. Cl.
*H04W 76/36*        (2018.01)
*H04L 5/00*         (2006.01)
(Continued)

(52) U.S. Cl.
CPC .......... *H04W 16/14* (2013.01); *H04L 5/0053* (2013.01); *H04L 5/0073* (2013.01); *H04W 72/0453* (2013.01); *H04W 76/36* (2018.02)

(58) Field of Classification Search
CPC . H04W 72/0453; H04W 76/36; H04W 16/14; H04L 5/0073; H04L 5/0053; H04L 5/0007; H04L 5/0094
See application file for complete search history.

(56) References Cited

U.S. PATENT DOCUMENTS 10,104,693 B1 * 10/2018 Zhang ................. H04W 72/563
2013/0156005 A1 *  6/2013 Li ........................ H04W 36/06
                                                      370/329

(Continued)

FOREIGN PATENT DOCUMENTS

WO    WO-2021014627 A1    1/2021

OTHER PUBLICATIONS

Jun-ichi Abe et al., "Direct spectrum division transmission for highly efficient satellite communications", 2010 5th Advanced Satellite Multimedia Systems Conference and the 11th Signal Processing for Space Communications Workshop, Sep. 13, 2010, pp. 401-406.

(Continued)

*Primary Examiner* — Syed Ali
(74) *Attorney, Agent, or Firm* — Harness, Dickey & Pierce, P.L.C.

(57) ABSTRACT

In a band sharing communication system in which there are a primary system and a secondary system in descending order of priority of communication, the systems share frequency bands, and a base station or a line control device performs allocation of a requested band of a terminal station of each system, the base station or the line control device (Continued)

includes: occupied band setting means for setting a primary occupied band and a secondary occupied band adjacent to the primary occupied band; band allocation means for allocating a vacant band of the primary occupied band with respect to a requested band of a primary terminal station and allocating a vacant band of the secondary occupied band with respect to a requested band of a secondary terminal station; and band transferring means for, when there is no vacant band in the primary occupied band with respect to the requested band of the primary terminal station, if a vacant band equivalent to the requested band is present in the secondary occupied band such that the vacant band is adjacent to the primary occupied band, transferring the vacant band from the secondary occupied band to the primary occupied band and allocating the vacant band to the primary terminal station, and if communication is being performed in a band in the secondary occupied band which is adjacent to the primary occupied band and equivalent to the requested band, transferring a vacant band created by making a suspension request to the secondary terminal station performing the communication from the secondary occupied band to the primary occupied band and allocating the vacant band to the primary terminal station.

3 Claims, 7 Drawing Sheets

(51) Int. Cl.
*H04W 16/14* (2009.01)
*H04W 72/0453* (2023.01)

(56) References Cited

U.S. PATENT DOCUMENTS

| | | | | |
|---|---|---|---|---|
| 2014/0038657 | A1* | 2/2014 | Jo | H04W 72/30 |
| | | | | 455/509 |
| 2014/0293945 | A1* | 10/2014 | Kato | H04W 72/0453 |
| | | | | 370/329 |
| 2014/0301237 | A1* | 10/2014 | Yi | H04W 16/14 |
| | | | | 370/252 |
| 2015/0038139 | A1* | 2/2015 | Chun | H04W 60/00 |
| | | | | 455/435.1 |
| 2015/0223243 | A1* | 8/2015 | Tabet | H04L 5/0073 |
| | | | | 370/330 |
| 2017/0230839 | A1* | 8/2017 | Cui | H04W 16/14 |
| 2017/0303280 | A1* | 10/2017 | Chun | H04L 27/2603 |
| 2017/0373914 | A1* | 12/2017 | Harada | H04W 16/14 |
| 2018/0063817 | A1* | 3/2018 | Chakraborty | H04W 74/0816 |
| 2018/0098224 | A1* | 4/2018 | Sun | H04W 72/0453 |
| 2022/0272702 | A1 | 8/2022 | Goto et al. | |

OTHER PUBLICATIONS

Tugba Erpek et al., "An optimal application-aware resource block scheduling in LTE", 2015 International Conference on Computing, Networking and Communications (ICNC), Feb. 16, 2015. pp. 275-279.

* cited by examiner

Fig. 1
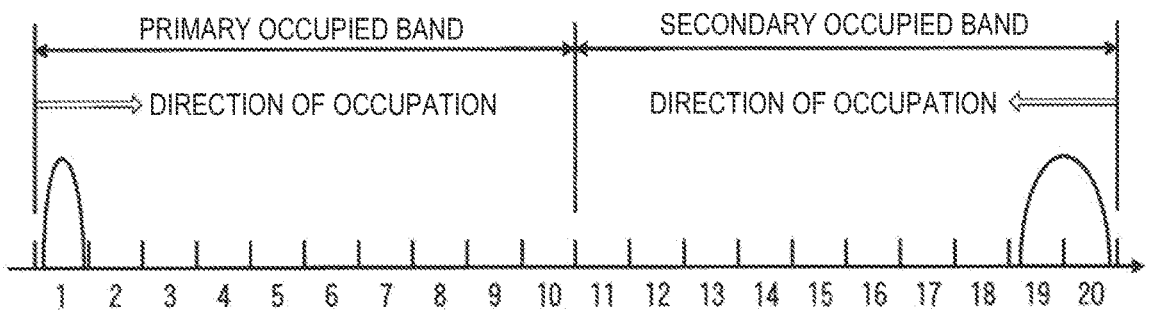
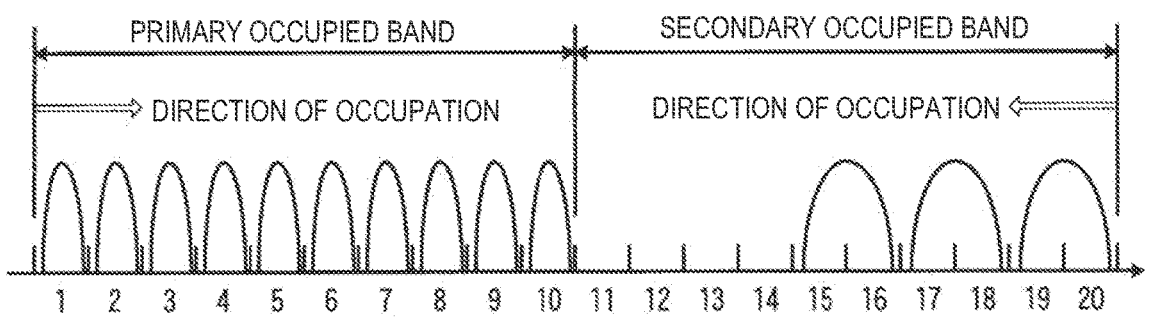
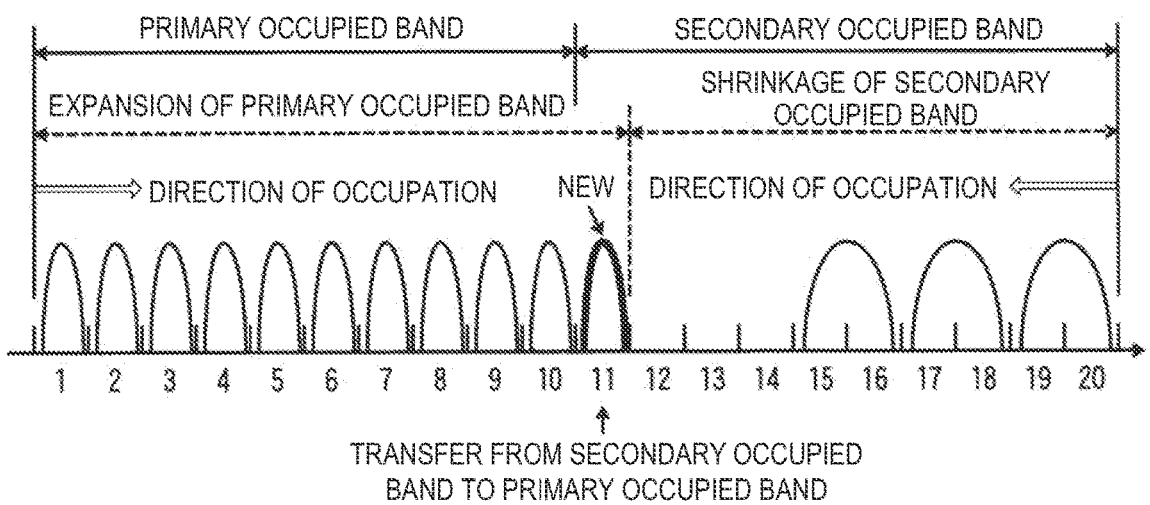

Fig. 6
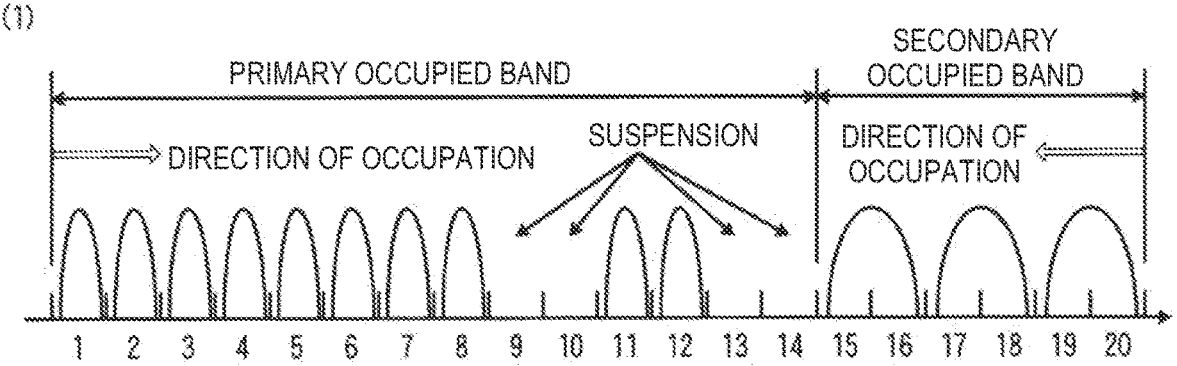
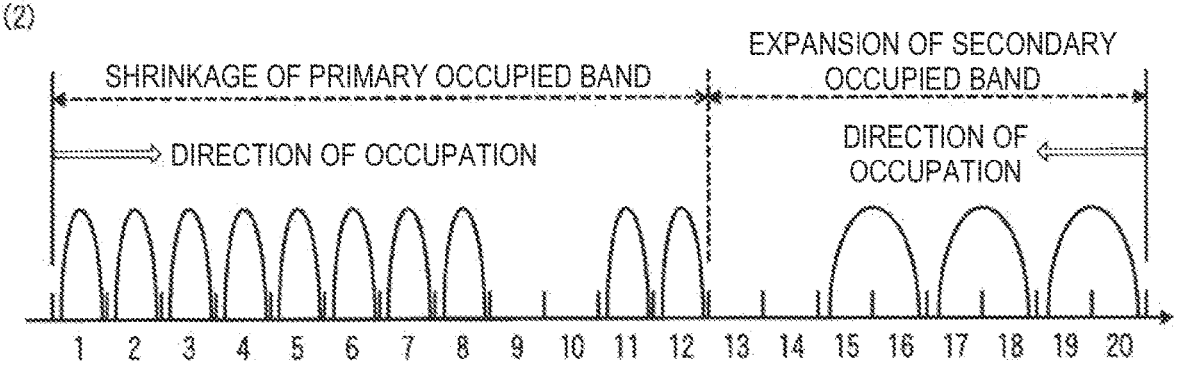
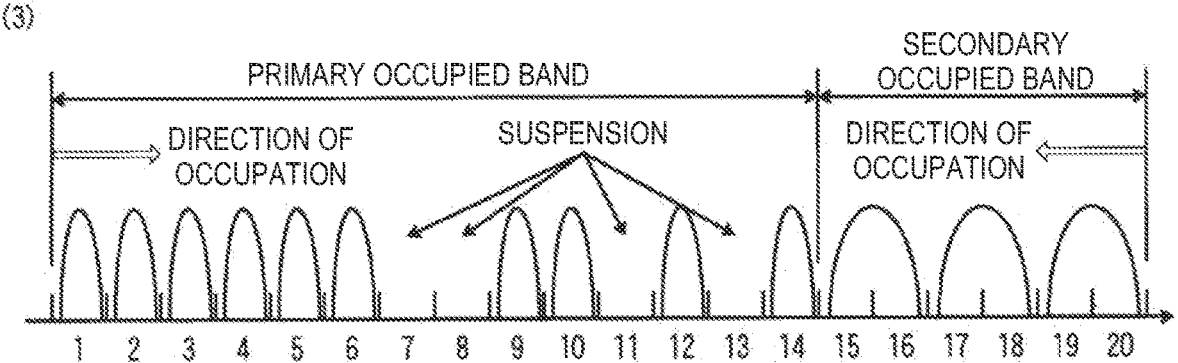

BAND SHARING COMMUNICATION SYSTEM, LINE CONTROL METHOD, LINE CONTROL DEVICE, AND LINE CONTROL PROGRAM

TECHNICAL FIELD

The present invention relates to a band sharing communication system where a primary system and a secondary system share frequency bands in descending order of priority of communications, a line control method, a line control device and a line control program.

BACKGROUND ART

In an FDMA (Frequency Division Multiple Access) scheme, multiple users share frequency bands to perform communications. For example, a primary terminal station A of a primary system with higher priority and a secondary terminal station B of a secondary system with lower priority are respectively allocated frequency bands under the control of a common base station. The same applies to where the primary system and the secondary system are independent of each other with an independent base station provided for each system and a common line control device allocates the frequency bands of the primary system and the secondary system.

In such cases, it is desired to increase frequency utilization efficiency by minimizing vacant bands. For example, an OFDM (Orthogonal Frequency Division Multiplexing) scheme, which is an approach to multiplexing subcarriers of narrow bands, can make a frequency spectrum steep and increase frequency utilization efficiency by reducing transition areas in the spectrum. In satellite communications, a scheme with a roll-off rate of 0.02 has been adopted as a standard also in single carrier schemes and there is an increasing demand for improved frequency utilization efficiency.

Against such a background, there have been studies on approaches to making effective utilization of a frequency band by utilizing vacant bands as much as possible among multiple communication services.

For example, Non-Patent Literature 1 proposes spectrum division transmission which seeks effective utilization of frequency by dividing a band of a single carrier with respect to a vacant band. This enables the vacant band to be filled with the band divided into narrow bands regardless of what kind of carrier the band of an actual signal is.

Non-Patent Literature 2 is a method of making effective use of frequency by using an optimal priority control for an application in allocation of time-frequency resource blocks in OFDMA (Orthogonal Frequency Division Multiple Access), used in the downlink of the LTE system.

Such an approach where a base station (or a line control device) dynamically manages bands and allocates an optimal resource arrangement to terminal stations can achieve flexible priority control by using a communication scheme having high degree of freedom in time-frequency width.

CITATION LIST

Non-Patent Literature

Non-Patent Literature 1: J. Abe, F. Yamashita and K. Kobayashi, "Direct spectrum division transmission for highly efficient satellite communications.", 2010 5th Advanced Satellite Multimedia Systems Conference and the 11th Signal Processing for Space Communications Workshop, pp. 401-40 6, 2010.

Non-Patent Literature 2: T. Erpek, A. Abdelhadi and T. C. Clancy, "An optimal application-aware resource block scheduling in LTE", 2015 International Conference on Computing, Networking and Communications (ICNC), pp. 2 75-279, 2015.

SUMMARY OF THE INVENTION

Technical Problem

Here, consider a case where a prescribed frequency band is efficiently shared under the following constraints:

(1) The band is shared by multiple systems.
(2) An order of priorities exists among the systems.
(3) The systems are each independent and basically operate on different frequencies according to the FDMA scheme.
(4) A bandwidth of a carrier transmitted by a station in each system is fixed and does not permit flexible arrangement such as changing the bandwidth as a function of vacant bands or divided arrangement with subcarriers like the spectrum division transmission technique of Non-Patent Literature 1 or in OFDMA, for example.
(5) A base station has no function of dynamically allocating resource to each terminal station.

With these constraints, a resource block has to be split along the frequency axis and moreover allocation must be continuous.

Then, it is impossible to make effective use of vacant bands by distributed arrangement in the frequency domain like Non-Patent Literature 1 or by allocation in the time domain like Non-Patent Literature 2.

Further, as dynamic and flexible band allocation is not possible, bands must be allocated pursuant to a certain defined policy and conventional approaches cannot be utilized.

An object of the present invention is to provide a band sharing communication system that allows systems with different priorities of band occupation to keep track of utilization of an entire band and can achieve efficient band sharing only with band allocation and line disconnection, and a line control method, a line control device and a line control program.

Means for Solving the Problem

A first aspect of the present invention provides a band sharing communication system in which there are a primary system and a secondary system in descending order of priority of communication, the systems share frequency bands, and a base station or a line control device performs allocation of a requested band of a terminal station of each system. The base station or the line control device includes: occupied band setting means for setting a primary occupied band and a secondary occupied band adjacent to the primary occupied band; band allocation means for allocating a vacant band of the primary occupied band with respect to a requested band of a primary terminal station and allocating a vacant band of the secondary occupied band with respect to a requested band of a secondary terminal station; and band transferring means for, when there is no vacant band in the primary occupied band with respect to the requested band of the primary terminal station, if a vacant band equivalent to the requested band is present in the secondary occupied band such that the vacant band is adjacent to the primary occupied band, transferring the vacant band from the secondary occupied band to the primary occupied band and allocating the vacant band to the primary terminal station, and if communication is being performed in a band in the secondary occupied band which is adjacent to the primary occupied band and equivalent to the requested band, transferring a vacant band created by making a suspension request to the secondary terminal station performing the communication from the secondary occupied band to the primary occupied band and allocating the vacant band to the primary terminal station.

A second aspect of the present invention provides a line control method for a band sharing communication system in which there are a primary system and a secondary system in descending order of priority of communication, and the systems share frequency bands and allocation of a requested band of a terminal station of each system is performed. The method includes: an occupied band setting step of setting a primary occupied band and a secondary occupied band adjacent to the primary occupied band; a band allocation step of allocating a vacant band of the primary occupied band with respect to a requested band of a primary terminal station and allocating a vacant band of the secondary occupied band with respect to a requested band of a secondary terminal station; and a band transferring step of, when there is no vacant band in the primary occupied band with respect to the requested band of the primary terminal station, if a vacant band equivalent to the requested band is present in the secondary occupied band such that the vacant band is adjacent to the primary occupied band, transferring the vacant band from the secondary occupied band to the primary occupied band and allocating the vacant band to the primary terminal station, and if communication is being performed in a band in the secondary occupied band which is adjacent to the primary occupied band and equivalent to the requested band, transferring a vacant band created by making a suspension request to the secondary terminal station performing the communication from the secondary occupied band to the primary occupied band and allocating the vacant band to the primary terminal station.

A third aspect of the present invention provides a line control device for a band sharing communication system in which there are a primary system and a secondary system in descending order of priority of communication, and the systems share frequency bands and allocation of a requested band of a terminal station of each system is performed. The line control device includes: occupied band setting means for setting a primary occupied band and a secondary occupied band adjacent to the primary occupied band; band allocation means for allocating a vacant band of the primary occupied band with respect to a requested band of a primary terminal station and allocating a vacant band of the secondary occupied band with respect to a requested band of a secondary terminal station; and band transferring means for, when there is no vacant band in the primary occupied band with respect to the requested band of the primary terminal station, if a vacant band equivalent to the requested band is present in the secondary occupied band such that the vacant band is adjacent to the primary occupied band, transferring the vacant band from the secondary occupied band to the primary occupied band and allocating the vacant band to the primary terminal station, and if communication is being performed in a band in the secondary occupied band which is adjacent to the primary occupied band and equivalent to the requested band, transferring a vacant band created by making a suspension request to the secondary terminal station performing the communication from the secondary occupied band to the primary occupied band and allocating the vacant band to the primary terminal station.

A fourth aspect of the present invention provides a line control program for causing a computer to perform processing executed by the line control device according to the third aspect, so as to perform setting of each occupied band, allocation of a vacant band of each occupied band with respect to a requested band of each terminal station, and a transfer process from the secondary occupied band to the primary occupied band.

Effects of the Invention

When bands utilized by the primary system with higher priority of band occupation and the secondary system with lower priority conflict with each other, the present invention can achieve efficient band sharing by disconnecting a line on the side of the secondary system and transferring it to the primary system, thereby expanding the occupied band of the primary system and shrinking the occupied band of the secondary system.

BRIEF DESCRIPTION OF DRAWINGS

FIG. 1 shows an example of band sharing in a band sharing communication system of the present invention.

FIG. 6 illustrates shrinkage of the primary occupied band with suspension in the primary system.

DESCRIPTION OF EMBODIMENTS

Figure 2:
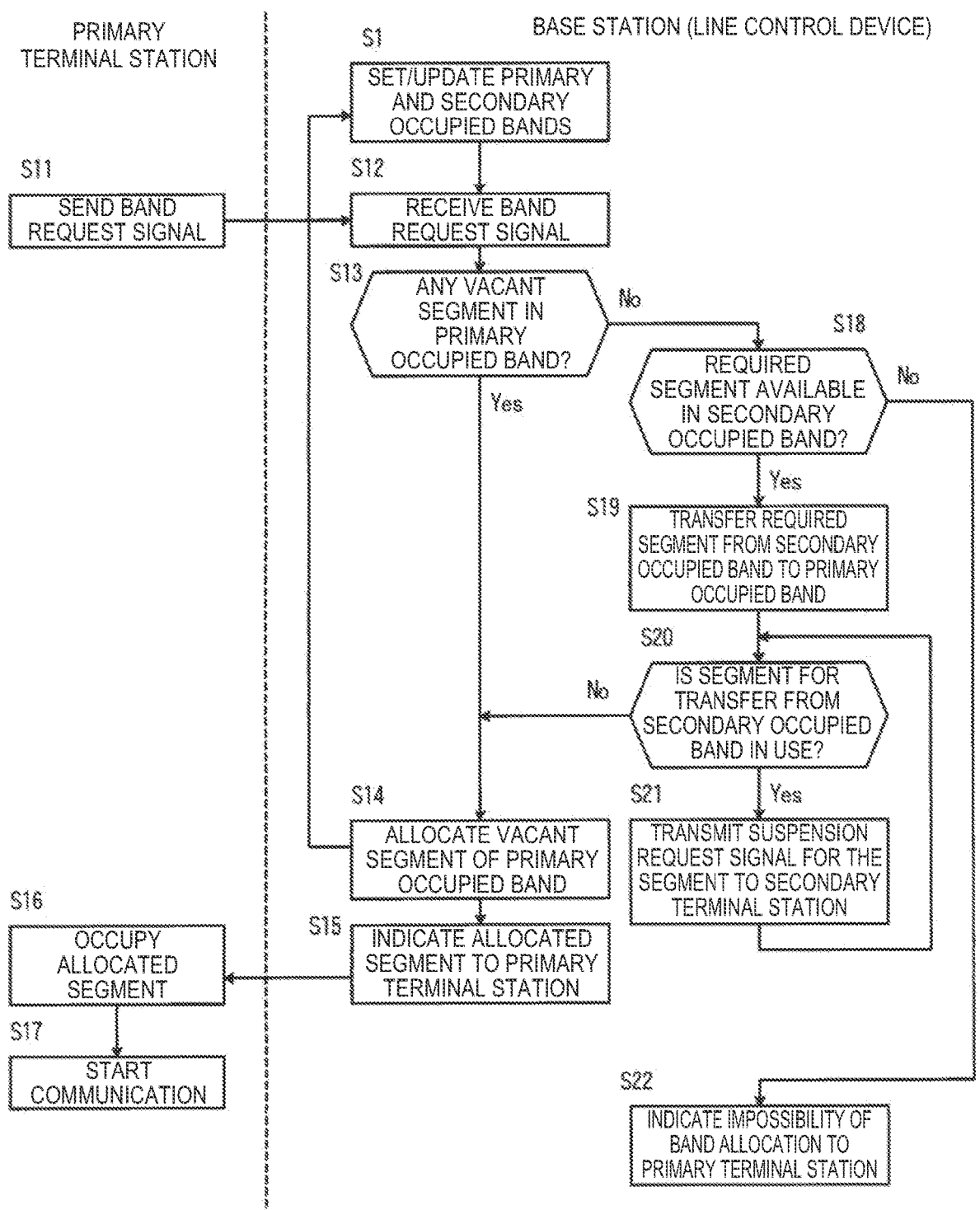
FIG. 2 is a flowchart illustrating a band allocation procedure between a primary terminal station and a base station in the band sharing communication system of the present invention.

According to the present invention, a system band is divided into segments and a primary system with higher priority and a secondary system with lower priority each occupy consecutive frequency bands in units of segments, as shown in FIG. 1. For example, when a lower frequency band side of the system band is defined as the frequency band to be occupied by the primary system (hereinbelow a primary occupied band), the remaining higher frequency band side is the frequency band to be occupied by the secondary system (hereinbelow a secondary occupied band). Herein, given that the system band is 20 segments, segments 1 to 10 are allocated to the primary occupied band and segments 11 to 20 are allocated to the secondary occupied band as an example of initial setting. The bandwidths that are individually used by a terminal station of the primary system (hereinbelow referred to as a primary terminal station) and a terminal station of the secondary system (hereinbelow a secondary terminal station) are assumed to be one segment and two segments, respectively.

A base station or a line control device connected to the base station allocates vacant segments of the primary occupied band and the secondary occupied band in opposite directions to each another in response to band occupation requests from the primary terminal station and the secondary terminal station. For example, the primary terminal station is allocated vacant segments from the lower frequency side (segment 1), while the secondary terminal station is allocated vacant segments from the higher frequency side (segment 20). The respectively allocated segments are indicated to the primary terminal station and the secondary terminal station via control signals. The primary terminal station and the secondary terminal station occupy the allocated segments and start communication.

A feature of the present invention is that when there is a band occupation request from a further new primary terminal station while the primary system occupies all of the primary occupied band, the secondary occupied band adjacent to the primary occupied band is transferred to the primary occupied band in units of segments to expand the primary occupied band, thus addressing the band occupation request of the primary terminal station, as shown in FIGS. 1(2) and (3). In doing so, if the segment to be transferred from the secondary occupied band to the primary occupied band is vacant, the secondary occupied band is simply shrunk. If a secondary terminal station is performing communication in the segment of interest, the base station instructs the secondary terminal station performing communication in the segment to suspend and shrinks the secondary occupied band (discussed in more detail later). In contrast, when there is a band occupation request from a further new secondary terminal station while a secondary terminal station occupies all of the secondary occupied band, the secondary occupied band is not expanded and band allocation is determined to be impossible.

FIG. 2 shows a band allocation procedure between the primary terminal station and the base station in a band sharing communication system of the present invention.

Figure 3:
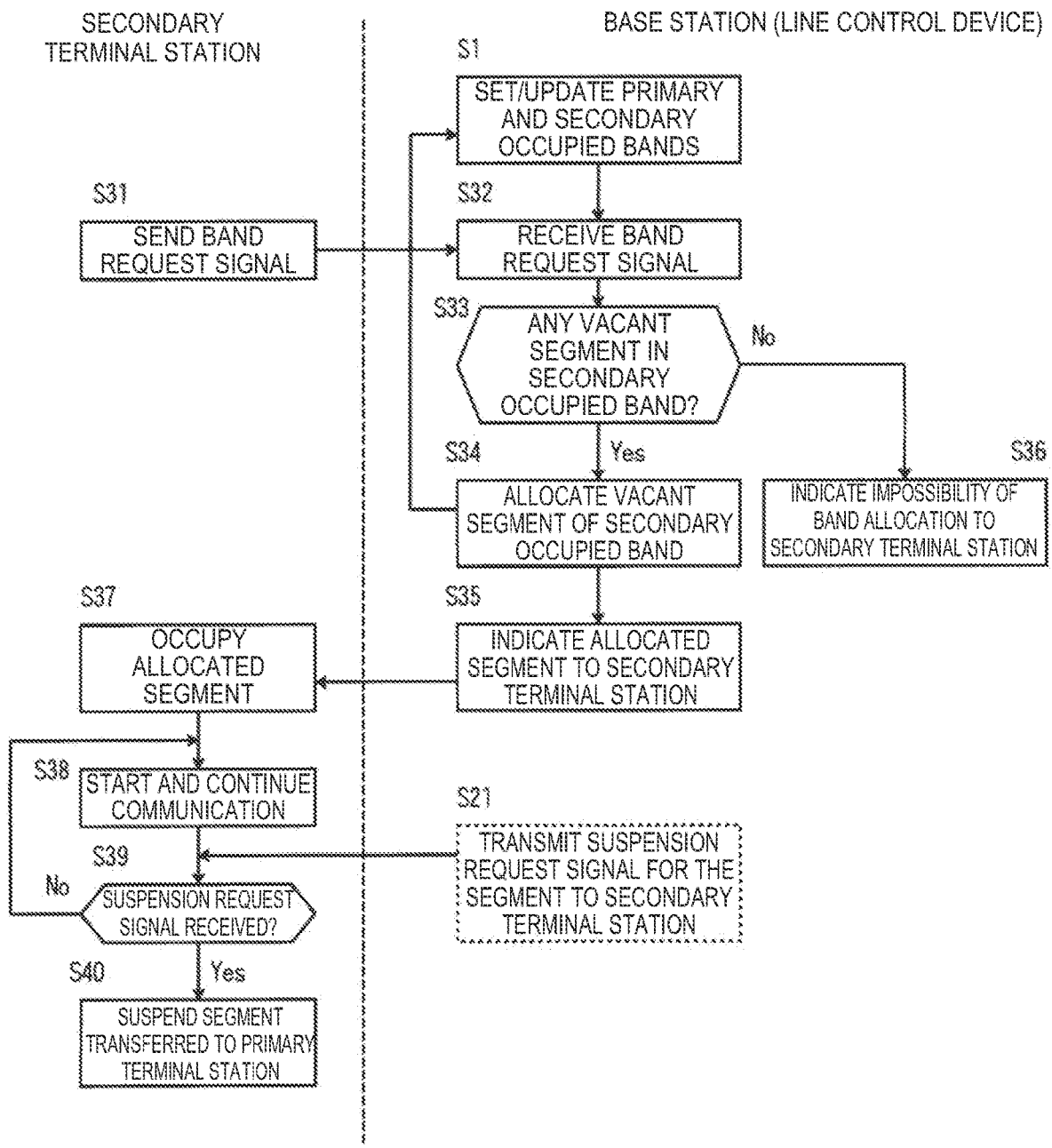
FIG. 3 is a flowchart illustrating a band allocation procedure between a secondary terminal station and the base station in the band sharing communication system of the present invention.

FIG. 3 shows a band allocation procedure between the secondary terminal station and the base station in the band sharing communication system of the present invention.

In FIGS. 2 and 3, the base station initially sets the primary occupied band and the secondary occupied band (S1). The primary occupied band and the secondary occupied band are updated in response to expansion/shrinkage of the primary occupied band and expansion/shrinkage of the secondary occupied band as discussed later.

In FIG. 2, when the primary terminal station sends a band request signal to the base station (S11) and the base station receives the band request signal (S12), the base station determines whether there are vacant segments in the primary occupied band or not (S13). If there are vacant segments in the primary occupied band, the base station then allocates the vacant segments in units of one segment (S14) and indicates the allocated segments to the primary terminal station (S15). Here, in the example shown in FIG. 1, the base station sequentially allocates vacant segments from segment 1, which is the lower limit of the primary occupied band, to segment 10, which is the upper limit. The primary terminal station occupies the allocated segments (S16) and starts communication (S17). The process above is repeated until segment 10 as the upper limit of the primary occupied band is occupied.

In FIG. 3, when the secondary terminal station sends a band request signal to the base station (S31) and the base station receives the band request signal (S32), the base station determines whether there are vacant segments in the secondary occupied band or not (S33). If there are vacant segments in the secondary occupied band, the base station then allocates the vacant segments in units of two segments (S34), and indicates the allocated segments to the secondary terminal station (S35). If there is no vacant segment in the secondary occupied band, the base station indicates impossibility of band allocation to the secondary terminal station (S36). Here, in the example shown in FIG. 1, the base station sequentially allocates the vacant segments from segment 20 as the upper limit of the secondary occupied band to segment 11 as the lower limit. The secondary terminal station occupies the allocated segments (S37) and starts communication (S38). The process above is repeated until segment 11 as the lower limit of the secondary occupied band is occupied.

Figure 4:
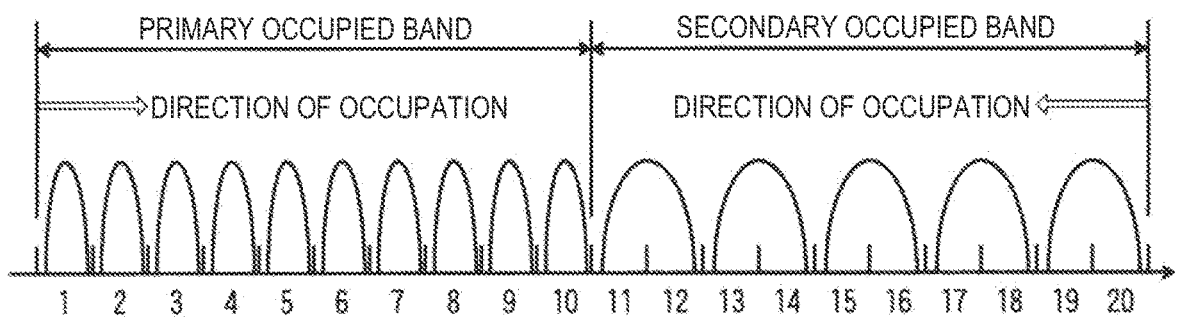
FIG. 4 shows an example of band allocation in a primary occupied band and a secondary occupied band.

Here, a situation where the primary system occupies the segments 1 to 10 of the primary occupied band and the secondary system occupies the segments 20 to 11 of the secondary occupied band is shown in FIG. 4. A processing procedure when a new primary terminal station sends a band occupation request to the base station in this situation is described.

In FIG. 2, if there is no vacant segment in the primary occupied band at step S13, the base station determines whether a required segment (here, one segment) is available in the secondary occupied band or not (S18). If the required segment is not available in the secondary occupied band, the base station indicates impossibility of band allocation to the primary terminal station (S22). If the required segment is available in the secondary occupied band, the base station transfers a segment equivalent to the required segment from the secondary occupied band to the primary occupied band (S19). Then, the base station determines whether the segment being transferred from the secondary occupied band to the primary occupied band is in use or vacant (S20). If the segment is vacant, the base station allocates the segment transferred from the secondary occupied band as a vacant segment of the primary occupied band (S14), and indicates the allocated segment to the primary terminal station (S15). Whereupon, the base station performs an updating process to expand the primary occupied band and shrink the secondary occupied band (S1). The primary terminal station occupies the allocated segment (S16) and starts communication (S17).

Figure 5:
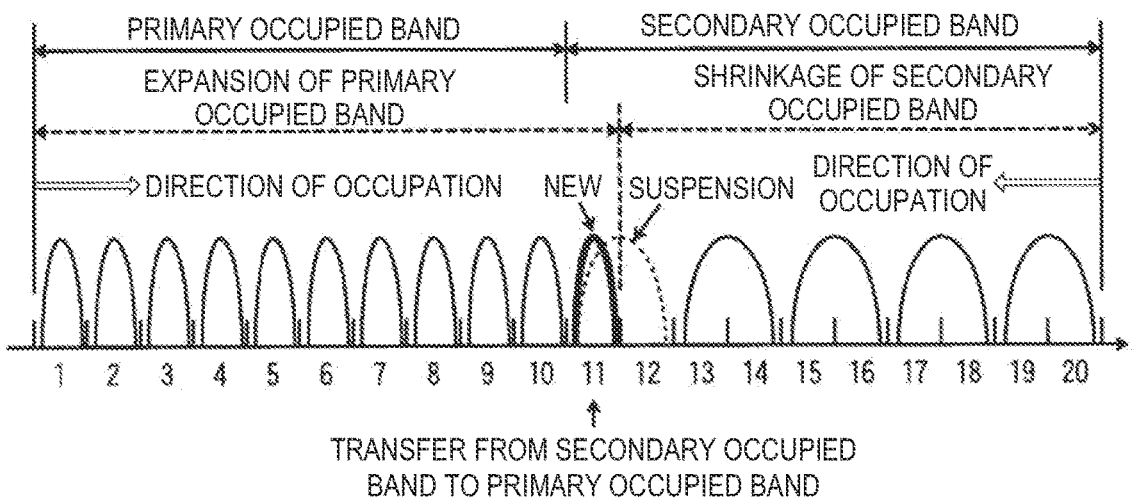
FIG. 5 illustrates expansion of the primary occupied band.

If the segment being transferred from the secondary occupied band to the primary occupied band is in use, the base station transmits a suspension request signal for that segment to the secondary terminal station (S21) and returns to step S20. When the secondary terminal station is continuing communication (S38 in FIG. 3) and receives the suspension request signal for the segment being transferred from the secondary occupied band to the primary occupied band from the base station (S39 in FIG. 3), it suspends the segment (S40 in FIG. 3). Consequently, the segment being transferred from the secondary occupied band becomes vacant at step S20, while at the primary terminal station, communication in the segment transferred from the secondary occupied band to the primary occupied band becomes possible (S14 to S17), upon which expansion of the primary occupied band and shrinkage of the secondary occupied band are substantially completed. This situation is shown in FIG. 5.

For the communication in the segment which has been suspended by the secondary terminal station in response to the suspension request from the base station, reconnection is made if there is a vacant segment in the secondary occupied band and the communication is simply discontinued if there is no vacant segment.

(When Vacant Segments Occur in the Primary Occupied Band and the Secondary Occupied Band)

When communication by the primary terminal station ends and vacant segments occur in the primary occupied band, different measures are taken depending on whether the primary occupied band and the secondary occupied band contain adjacent segments or not. When a segment adjacent to the secondary occupied band becomes vacant in the primary occupied band, the base station transfers consecutive vacant segments 14, 13 starting from segment 14 to the secondary occupied band from the primary occupied band and performs an updating process to shrink the primary occupied band and expand the secondary occupied band, as shown in FIGS. 6(1) and (2). In the primary system, expansion of the primary occupied band is possible by forced transfer of segments from the secondary occupied band to the primary occupied band, while forced expansion is impossible for the secondary occupied band. Accordingly, in the updating process above, the base station incorporates the vacant segments of the primary occupied band that are adjacent to the secondary occupied band to the secondary occupied band, thereby adjusting the primary system and the secondary system. In the secondary system, the vacant segments 13, 14 can then be allocated to a new secondary terminal station.

Figure 7:
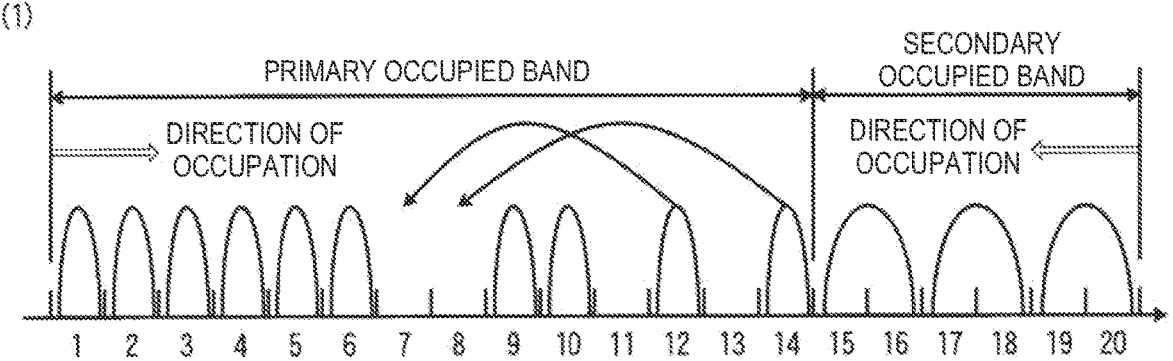
FIG. 7 illustrates shrinkage of the primary occupied band with suspension in the primary system.

By contrast, when a segment other than the segment adjacent to the secondary occupied band becomes vacant in the primary occupied band, the base station leaves that vacant segment as it is and does not perform an updating process of the primary occupied band and the secondary occupied band, as shown in FIG. 6(3). However, in this situation, frequency utilization decreases because the vacant segment of the primary occupied band cannot be used by the secondary system. Thus, the base station may perform processing for once disconnecting the segment in use of the primary occupied band adjacent to the secondary occupied band and reconnecting to the vacant segment as shown in FIG. 7(1). As a result, consecutive vacant segments 11 to 14 become available for transfer from the primary occupied band to the secondary occupied band as shown in FIG. 7(2), and the base station can perform an updating process to shrink the primary occupied band and expand the secondary occupied band.

Figure 8:
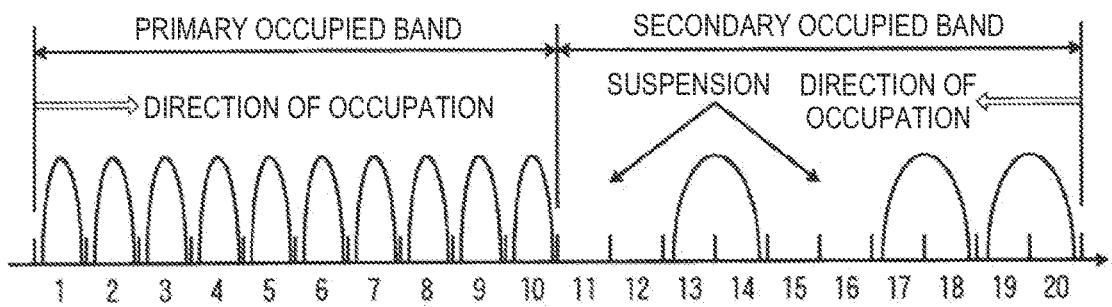
FIG. 8 illustrates constancy of the secondary occupied band with suspension in the secondary system.

When communication by the secondary terminal station ends and vacant segments occur in the secondary occupied band, the base station does not transfer the vacant segments of the secondary occupied band to the primary occupied band and maintains the secondary occupied band regardless of whether the primary occupied band and the secondary occupied band contain adjacent segments or not, as shown in FIG. 8.

Figure 9:
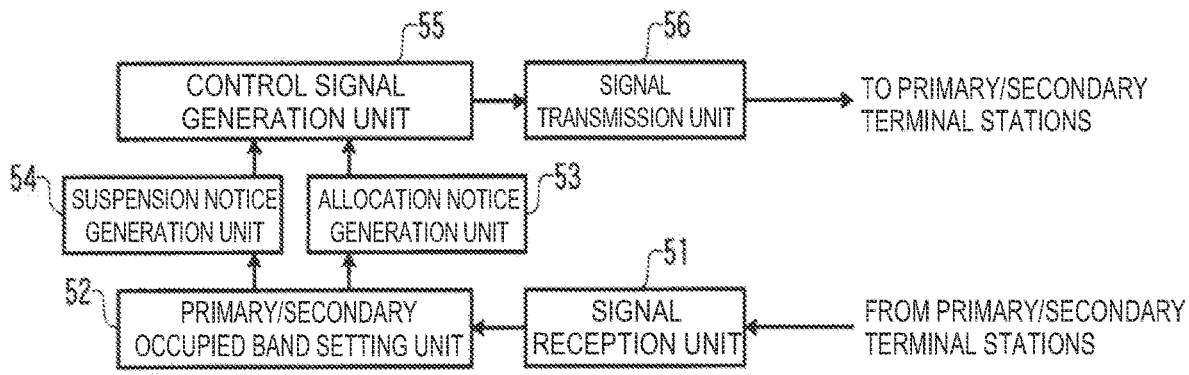
FIG. 9 shows a configuration example of a base station or a line control device.

FIG. 9 shows a configuration example of the base station or the line control device. Only those portions that are relevant to the present invention are illustrated here.

In FIG. 9, the base station or the line control device includes a signal reception unit 51 that receives band request signals from the primary terminal station and the secondary terminal station, a primary/secondary occupied band setting unit 52 that performs setting and updating process for the primary occupied band and the secondary occupied band as shown in FIGS. 2 and 3, an allocation notice generation unit 53 that indicates allocated segments or impossibility of band allocation to the primary terminal station and the secondary terminal station, a suspension notice generation unit 54 that indicates a suspension request to the secondary terminal station, a control signal generation unit 55 that generates a control signal indicative of allocated segments, impossibility of band allocation or a suspension request, and a signal transmission unit 56 that transmits control signals to the primary terminal station and the secondary terminal station.

Figure 10:
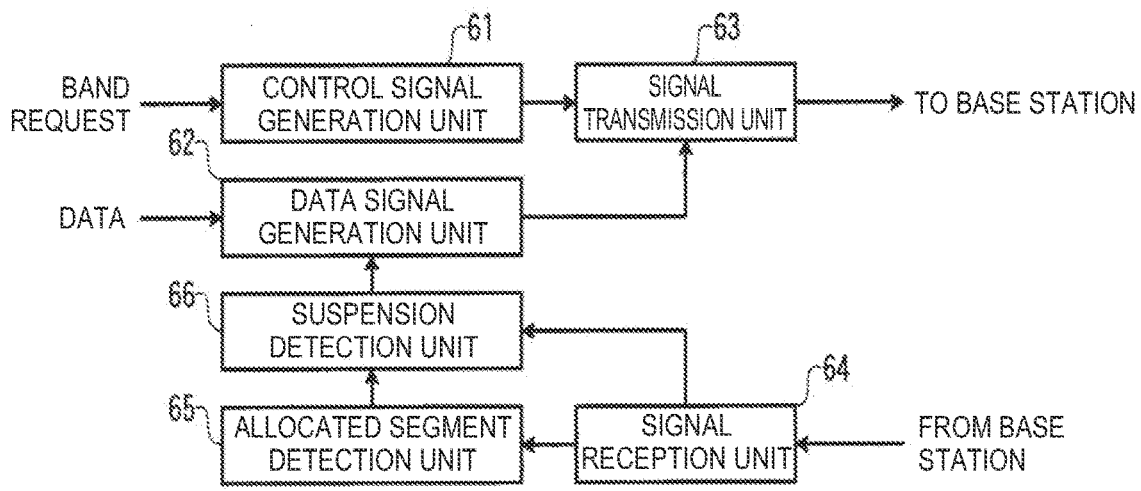
FIG. 10 shows a configuration example of a terminal station.

FIG. 10 shows a configuration example of the primary terminal station and the secondary terminal station. Only those portions that are relevant to the present invention are illustrated here.

In FIG. 10, the primary terminal station and the secondary terminal station include a control signal generation unit 61 that generates a control signal such as a band request signal, a data signal generation unit 62 that generates a data signal, a signal transmission unit 63 that transmits the control signal and the data signal to the base station, a signal reception unit 64 that receives allocated segments and a suspension notice from the base station, an allocated segment detection unit 65 that detects the allocated segments from a received signal and outputs them to the data signal generation unit 62, and a suspension detection unit 66 that detects a suspension notice from a received signal and outputs it to the data signal generation unit 62.

REFERENCE SIGNS LIST 51 signal reception unit
52 primary/secondary occupied band setting unit
53 allocation notice generation unit
54 suspension notice generation unit
55 control signal generation unit
56 signal transmission unit
61 control signal generation unit
62 data signal generation unit
63 signal transmission unit
64 signal reception unit
65 allocated segment detection unit
66 suspension detection unit

The invention claimed is:

1. A band sharing communication system in which there are a primary system and a secondary system in descending order of priority of communication, the systems share frequency bands, and a base station or a line control device performs allocation of a requested band of a terminal station of each system, the base station or the line control device comprising:
    a processor; and
    a non-transitory storage medium having computer program instructions stored thereon, when executed by the processor, perform to:
    set a frequency band to be occupied by the primary system as a primary occupied band and a frequency band adjacent to the primary occupied band and to be occupied by the secondary system as a secondary occupied band;
    allocate a vacant band of the primary occupied band with respect to a requested band of a primary terminal station of the primary system and allocate a vacant band of the secondary occupied band with respect to a requested band of a secondary terminal station of the secondary system; when there is no vacant band in the primary occupied band with respect to the requested band of the primary terminal station, and when a vacant band equivalent to the requested band is present in the secondary occupied band such that the vacant band is adjacent to the primary occupied band, transfer the vacant band from the secondary occupied band to the primary occupied band and allocate the vacant band to the primary terminal station, and when communication is being performed in a band in the secondary occupied band which is adjacent to the primary occupied band and equivalent to the requested band, transfer a vacant band created by making a suspension request to the secondary terminal station performing the communication from the secondary occupied band to the primary occupied band and allocate the vacant band to the primary terminal station; and perform a reconnection process using a vacant band in the secondary occupied band for the communication of the secondary terminal station to which the suspension request has been made.

2. A line control method for a band sharing communication system in which there are a primary system and a secondary system in descending order of priority of communication, the systems share frequency bands, and allocation of a requested band of a terminal station of each system is performed, the method comprising:

setting a frequency band to be occupied by the primary system as a primary occupied band and a frequency band adjacent to the primary occupied band and to be occupied by the secondary system as a secondary occupied band;

allocating a vacant band of the primary occupied band with respect to a requested band of a primary terminal station of the primary system and allocating a vacant band of the secondary occupied band with respect to a requested band of a secondary terminal station of the secondary system;

when there is no vacant band in the primary occupied band with respect to the requested band of the primary terminal station and when a vacant band equivalent to the requested band is present in the secondary occupied band such that the vacant band is adjacent to the primary occupied band, transferring the vacant band from the secondary occupied band to the primary occupied band and allocating the vacant band to the primary terminal station, and when communication is being performed in a band in the secondary occupied band which is adjacent to the primary occupied band and equivalent to the requested band, transferring a vacant band created by making a suspension request to the secondary terminal station performing the communication from the secondary occupied band to the primary occupied band and allocating the vacant band to the primary terminal station; and performing a reconnection process using a vacant band in the secondary occupied band for the communication of the secondary terminal station to which the suspension request has been made.

3. A line control device for a band sharing communication system in which there are a primary system and a secondary system in descending order of priority of communication, the systems share frequency bands, and allocation of a requested band of a terminal station of each system is performed, the line control device comprising:

a processor; and a non-transitory storage medium having computer program instructions stored thereon, when executed by the processor, perform to:

set a frequency band to be occupied by the primary system as a primary occupied band and a frequency band adjacent to the primary occupied band and to be occupied by the secondary system as a secondary occupied band;

allocate a vacant band of the primary occupied band with respect to a requested band of a primary terminal station of the primary system and allocating a vacant band of the secondary occupied band with respect to a requested band of a secondary terminal station of the secondary system; and when there is no vacant band in the primary occupied band with respect to the requested band of the primary terminal station and when a vacant band equivalent to the requested band is present in the secondary occupied band such that the vacant band is adjacent to the primary occupied band, transfer the vacant band from the secondary occupied band to the primary occupied band and allocate the vacant band to the primary terminal station, and when communication is being performed in a band in the secondary occupied band which is adjacent to the primary occupied band and equivalent to the requested band, transfer a vacant band created by making a suspension request to the secondary terminal station performing the communication from the secondary occupied band to the primary occupied band and allocate the vacant band to the primary terminal station; and perform a reconnection process using a vacant band in the secondary occupied band for the communication of the secondary terminal station to which the suspension request has been made.

\* \* \* \* \*